N. J. BUSBY.
RESILIENT BLOCK.
APPLICATION FILED DEC. 6, 1909.
978,689.
Patented Dec. 13, 1910.
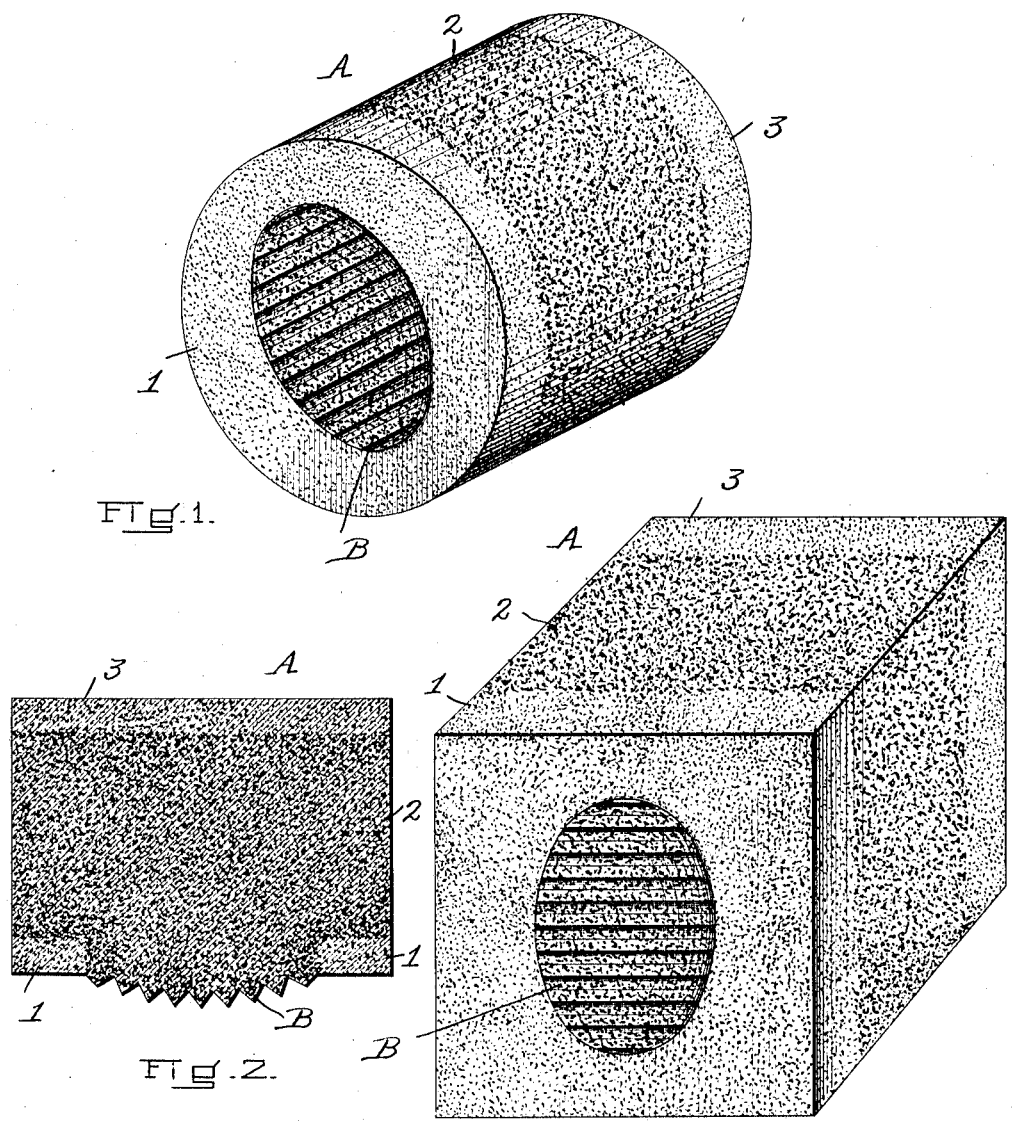
WITNESSES
Hibbard S. B. C. Busby.
A. L. May.
INVENTOR
Nahum Judson Busby
By Percy B. Hills
Atty.

UNITED STATES PATENT OFFICE.

NAHUM JUDSON BUSBY, OF BOSTON, MASSACHUSETTS.

RESILIENT BLOCK.

978,689.

Specification of Letters Patent.

Patented Dec. 13, 1910.

Application filed December 6, 1909. Serial No. 531,623.

*To all whom it may concern:*

Be it known that I, NAHUM JUDSON BUSBY, of Boston, in the county of Suffolk, State of Massachusetts, have invented a certain new and useful Improvement in Resilient Blocks; and I do hereby declare the following to be a full, clear, and exact description of the same, reference being had to the accompanying drawings, forming a part of this specification, and to the figures and letters of reference marked thereon.

My invention relates to resilient blocks adapted for use in springs or tread surfaces, and has for its object to provide an improved construction of the same that will be comparatively inexpensive, will more readily retain their position because of their novel composition and will possess highly durable qualities.

Specifically described my improved spring or tread surface is composed of an admixture of an elastic material, such as rubber, felt, fiber or leather, and finely broken quartz, the composition possessing sufficient elasticity, and, by reason of the quartz, being more durable and possessing anti-slipping qualities.

In the accompanying drawing—Figure 1 is a perspective view of a circular block embodying my invention. Fig. 2 is a sectional view of the same. Fig. 3 is a perspective view of a square block. Fig. 4 is a sectional view of a flat thin block suitable for a tread surface.

In the manufacture of my article I prefer to employ rubber as the elastic element, with which is mixed a quantity of finely comminuted quartz, and in the composition of the same I so proportion the ingredients that the center of the block A is composed mainly of the quartz, the proportion thereof to the rubber lessening as the edge of the block is reached. The advantage of this construction is that, when the article is used as a resistance pad, where there is often as high as two thousand pounds pressure exerted thereon, the weakest point being in the center of said pad, the blow will be more effectually resisted by the excess of quartz at that point. I also prefer to form one surface of the block into a slightly projecting oval surface B, which may or may not be corrugated, and which will cause the same to more firmly retain its adjusted position under pressure, and will also aid in resisting crushing strains on said block. By increasing the quantity of quartz at the center I not only reduce the wear on the block, but also increase its anti-slipping property.

A preferred method of manufacturing my improved article consists in first placing in a suitable mold a layer of the elastic element, such as rubber, with which is mixed the quartz, as shown at 1 in Fig. 2, and which is apertured to receive the oval surface B; then placing in the mold a layer 2 of rubber and quartz, the proportion of quartz being much greater than that in layer 1, and said layer projecting through the aperture in layer 1 to form the oval surface B; and finally adding the layer 3, in which the proportion of quartz is substantially that of layer 1. The mold being now put in the vulcanizing press and its contents vulcanized, the block produced will be properly united.

My improved articles are peculiarly adapted for use to receive shaping or molding dies for pressing felt and similar material wherein an elastic resistance is necessary in order to prevent the fiber of the material being operated on from being broken. They are also well adapted for use as car springs, as treads for stairs, and for many other purposes wherein an elastic anti-slipping effect is desired.

Having thus described my invention, what I claim as new and desire to secure by Letters Patent, is:

1. A resilient block, composed of a mixture of elastic material and comminuted quartz, the proportion of quartz being relatively greater at the center and diminishing toward the edges of the block.

2. A resilient block, composed of a mixture of elastic material and comminuted quartz, the proportion of quartz being relatively greater at the center and diminishing toward the edges thereof, and having its bearing surface formed into a projecting oval surface.

NAHUM JUDSON BUSBY.

Witnesses:
NAHUM J. BUSBY, Jr.,
HIBBARD S. B. C. BUSBY.